(12) United States Patent
Dickow et al.

(10) Patent No.: US 10,045,147 B2
(45) Date of Patent: Aug. 7, 2018

(54) APPLICATION CONTROL OF PRIMARY-CONNECTED DEVICES FROM SECONDARY-CONNECTED DEVICES

(71) Applicant: MYINE ELECTRONICS, INC., Ferndale, MI (US)

(72) Inventors: Justin Dickow, Royal Oak, MI (US); Joey Ray Grover, Madison Heights, MI (US); Scott Smereka, Warren, MI (US); John Byrne, Detroit, MI (US); Joel J. Fischer, Royal Oak, MI (US); Corey Maylone, Berkley, MI (US)

(73) Assignee: Livio, Inc., Royal Oak, MI (US)

( * ) Notice: Subject to any disclaimer, the term of this patent is extended or adjusted under 35 U.S.C. 154(b) by 21 days.

(21) Appl. No.: 15/002,202

(22) Filed: Jan. 20, 2016

(65) Prior Publication Data
US 2017/0208423 A1    Jul. 20, 2017

(51) Int. Cl.
*H04W 4/00* (2018.01)
*H04W 68/00* (2009.01)
*H04L 29/08* (2006.01)
*H04W 4/80* (2018.01)

(52) U.S. Cl.
CPC ............ *H04W 4/008* (2013.01); *H04L 67/12* (2013.01); *H04W 4/80* (2018.02); *H04W 68/005* (2013.01)

(58) Field of Classification Search
USPC ........................................................ 455/41.2
See application file for complete search history.

(56) References Cited

U.S. PATENT DOCUMENTS

| 8,571,571 | B2 | 10/2013 | Bauer et al. |
| 8,831,585 | B2 | 9/2014 | Nicholson et al. |
| 8,914,012 | B2 | 12/2014 | Crosbie et al. |
| 9,224,289 | B2* | 12/2015 | Demeniuk ............. G08C 17/02 |
| 2002/0186676 | A1* | 12/2002 | Milley ................ H04M 1/7253 370/341 |
| 2010/0134240 | A1* | 6/2010 | Sims ...................... G08C 17/02 340/5.1 |
| 2011/0021213 | A1* | 1/2011 | Carr ..................... H04B 5/0031 455/456.4 |

(Continued)

OTHER PUBLICATIONS

"SmartDevice Link," http://projects.genivi.org/smartdevicelink/about, retrieved Jan. 20, 2016, 2 pgs.

*Primary Examiner* — Edward Urban
*Assistant Examiner* — Ralph H Justus
(74) *Attorney, Agent, or Firm* — Jennifer M. Stec; Brooks Kushman P.C.

(57) ABSTRACT

A memory stores a message map associating requests with human-machine interface (HMI) notifications. A vehicle receives a request from a secondary-connected device, and sends an HMI notification to a primary-connected device, constructed based on the message map and the request, to simulate user input to the vehicle to cause the primary-connected device to perform the request. A secondary-connected device connected to a vehicle computing platform receives a command, constructs a request message describing the command; and sends the request message to the computing platform, to cause the computing platform to send a HMI notification to a primary-connected device to simulate user input to the vehicle requesting the primary-connected device to perform the command.

18 Claims, 5 Drawing Sheets

(56) References Cited

U.S. PATENT DOCUMENTS

| | | | |
|---|---|---|---|
| 2012/0079002 A1* | 3/2012 | Boll | G07C 5/008 709/203 |
| 2013/0066518 A1* | 3/2013 | Chen | G08C 17/02 701/36 |
| 2013/0274997 A1* | 10/2013 | Chien | G06F 17/00 701/36 |
| 2014/0163771 A1 | 6/2014 | Demeniuk | |
| 2014/0179274 A1* | 6/2014 | O'Meara | H04L 63/0281 455/411 |
| 2014/0343753 A1 | 11/2014 | Kirsch | |
| 2015/0051787 A1 | 2/2015 | Doughty et al. | |
| 2015/0215954 A1* | 7/2015 | Pal | H04W 88/08 370/329 |
| 2016/0126995 A1* | 5/2016 | Li | H04W 8/183 455/558 |
| 2016/0149836 A1* | 5/2016 | Narayanan | H04L 51/04 709/206 |
| 2016/0197782 A1* | 7/2016 | Hort | H04L 41/0809 709/222 |
| 2016/0234870 A1* | 8/2016 | Borges | H04L 67/12 |

* cited by examiner

APPLICATION CONTROL OF PRIMARY-CONNECTED DEVICES FROM SECONDARY-CONNECTED DEVICES

TECHNICAL FIELD

Aspects of the disclosure generally relate to application control of primary-connected devices from secondary-connected devices.

BACKGROUND

To pair a phone or other mobile device with a vehicle, the user may enable BLUETOOTH on the device to be paired, and select from the vehicle computing system to begin the pairing process. To complete the pairing, the vehicle may display a personal identification number (PIN), and the user may enter the PIN into the device to be paired to the vehicle. Upon successful entry of the PIN, the vehicle computing system may display a message indicating that the mobile device is paired with the vehicle.

SmartDeviceLink (SDL) is a standard set of protocols and messages that connect applications on a smartphone to a vehicle head unit. This messaging enables a consumer to interact with their application using common in-vehicle interfaces such as a touch screen display, embedded voice recognition, steering wheel controls and various vehicle knobs and buttons. There are three main components that make up the SDL ecosystem. The core component is the software which vehicle manufacturers (OEMs) implement in their vehicle head units. Integrating this component into their head unit and HMI based on a set of guidelines and templates enables access to various smartphone applications. The optional SDL server can be used by Vehicle OEMs to update application policies and gather usage information for connected applications. The iOS and Android libraries are implemented by app developers into their applications to enable command and control via the connected head unit.

SUMMARY

In a first illustrative embodiment, a system includes a memory storing a message map associating requests with human-machine interface (HMI) notifications; and a processor of a vehicle, programmed to receive a request from a secondary-connected device, and send an HMI notification to a primary-connected device, constructed based on the message map and the request, to simulate user input to the vehicle to cause the primary-connected device to perform the request.

In a second illustrative embodiment, a method includes receiving a command initiated at a secondary-connected device connected to a vehicle computing platform; constructing a request message by the secondary-connected device describing the command; and sending the request message to the computing platform to cause the computing platform to send a simulated human-machine interaction (HMI) notification to a primary-connected device connected to the computing platform requesting the primary-connected device to perform the command.

In a third illustrative embodiment, a non-transitory computer-readable medium, comprising instructions that, when executed by a processor of a computing platform of a vehicle, cause the computing platform to receive a request message from a connected application of a secondary-connected device; access a message map corresponding to the connected application to determine a type of a notification message associated with a type of the request message; access a connection list including entries for each mobile device connected to the vehicle to identify a primary-connected device; and send the notification message to the primary-connected device to simulate user input to the vehicle, to cause the primary-connected device to process the request message.

DETAILED DESCRIPTION

Figure 1:
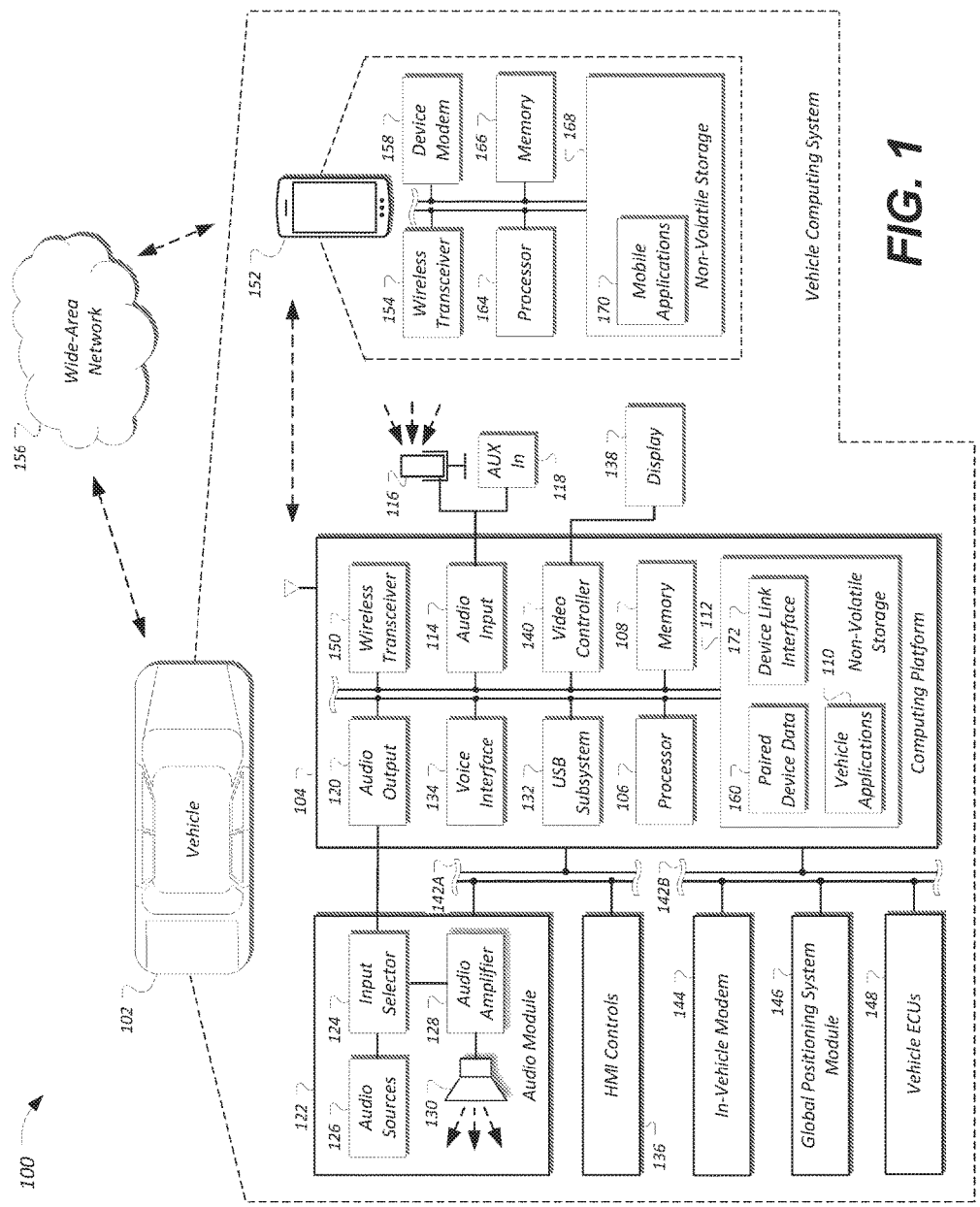
FIG. 1 illustrates an example diagram of a system that may be used to provide telematics services to a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle may allow for multiple devices to be paired to the vehicle. Yet, in many cases only one device may be connected to the vehicle as the driver or primary device. Various approaches may be used by the vehicle to choose which device is the primary device when multiple connected devices are available. In an example, the user may choose a device to be the favorite device that is preferred to be connected even if other paired devices are detected.

The device connected with the vehicle as the primary device may be provided with additional functionality when connected to the vehicle computing system. For instance, the connected device may be provided with access to audio functionality of the vehicle, such as to receive audio from a vehicle microphone or to playback audio through the vehicle sound system. As some other examples, the primary device may be provided with access to the head unit display, and/or the ability to run applications on the paired device that may be controlled via the head unit. The primary device's input screen may be disabled, but driver and/or passengers of the vehicle may be able to control the applications via the head unit. Due to their distance from the head unit display, passengers unable to reach the head unit display may be unable to control the applications.

A connected application, such as a media playback application, may be installed to the primary device as well as to one or more secondary mobile devices. The secondary mobile devices may be connected to the same vehicle computing system to which the primary device is also connected. Once connected, the vehicle computing system may relay information to the secondary mobile devices that is received from the primary mobile device, and receive information from the secondary mobile devices and relay that information to the primary device.

In an example, the connected application executed by the secondary device may receive input from a user. Based on the input, the secondary device may send commands to the vehicle instructing the vehicle computing platform to control the operation of another instance of the connected application executed by the primary device. The vehicle computing platform may support the messaging by managing a message map of requests received from secondary-connected devices to notification messages to be sent to the primary-connected devices. The computing platform may also maintain a connection list of the currently connected devices and connected applications. Using the connection list, the computing platform may identify the primary-connected device. Thus, by using the application and vehicle computing system, passengers installing the same connected application to their devices may be provided with control of the instance of the connected application being executed by the primary device.

FIG. 1 illustrates an example diagram of a system 100 that may be used to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 connected with both a memory 108 and a computer-readable storage medium 112 and configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory (e. g., tangible) medium that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a wired jack, such as a stereo input, or a wireless input, such as a BLUETOOTH audio connection. In some examples, the audio input 114 may be configure to provide audio processing capabilities, such as pre-amplification of low-level signals, and conversion of analog inputs into digital data for processing by the processor 106.

The computing platform 104 may also provide one or more audio outputs 120 to an input of the audio playback functionality of the audio module 122. In other examples, the computing platform 104 may provide audio output to the occupants through use of one or more dedicated speakers (not illustrated). The audio module 122 may include an input selector 124 configured to provide audio content from a selected audio source 126 to an audio amplifier 128 for playback through vehicle speakers 130. The audio sources 126 may include, as some examples, decoded amplitude modulated (AM) or frequency modulated (FM) radio signals, and compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to a grammar of available commands, and voice prompt generation for output via the audio module 122. In some cases, the system may be configured to temporarily mute, fade, or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke computing platform 104 functions (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as an vehicle modem 144 (which may not be present in some configurations), a global positioning system (GPS) module 146 configured to provide current vehicle 102 location and heading information, and various vehicle ECUs 148 configured to provide other types of information regarding the systems of the vehicle 102. As some non-limiting possibilities, the vehicle ECUs 148 may include a powertrain controller configured to provide control of engine operating components (e.g., idle control components, fuel delivery components, emissions control components, etc.) and monitoring of engine operating components (e.g., status of engine diagnostic codes); a body controller configured to manage various power control functions such as exterior lighting, interior lighting, keyless entry, remote start, and point of access status verification (e.g., closure status of the hood, doors and/or trunk of the vehicle 102); a radio transceiver configured to communicate with key fobs or other local vehicle 102 devices; and a climate control management controller configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142, and the vehicle modem 144, GPS module 146, and vehicle ECUs 148 may communicate with the computing platform 104 over a second in-vehicle network 142. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132.

The wide-area network 156 may provide communications services, such as packet-switched network services (e.g., Internet access, VoIP communication services), to devices connected to the wide-area network 156. An example of a wide-area network 156 may include a cellular telephone network. Mobile devices 152 may provide network connectivity to the wide-area network 156 via a device modem 158 of the mobile device 152. To facilitate the communications over the wide-area network 156, mobile devices 152 may be associated with unique device identifiers (e.g., media access control (MAC) addresses, mobile device numbers (MDNs), Internet protocol (IP) addresses, mobile station international subscriber directory numbers (MSISDNs), international mobile subscriber identity (IMSI), etc.) to identify the communications of the mobile devices 152 over the wide-area network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, secret information shared between the paired device and the computing platform 104 such as link keys, and/or personal identification numbers (PINs), and most recently used or device priority information, such that the computing platform 104 may automatically reconnect to the mobile devices 152 matching data in the paired device data 160 without user intervention. In some cases, the paired device data 160 may also indicate additional or options related to the permissions or functionality of the computing platform 104 that the paired mobile device 152 is authorized to access when connected.

When a paired mobile device 152 that supports network connectivity is automatically or manually connected to the computing platform 104, the mobile device 152 may allow the computing platform 104 to use the network connectivity of the device modem 158 to communicate over the wide-area network 156. In one example, the computing platform 104 may utilize a data-over-voice connection over a voice call or a data connection of the mobile device 152 to communicate information between the computing platform 104 and the wide-area network 156. Additionally or alternately, the computing platform 104 may utilize the vehicle modem 144 to communicate information between the computing platform 104 and the wide-area network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 or other locally-networked devices and with the wide-area network 156.

Figure 2:
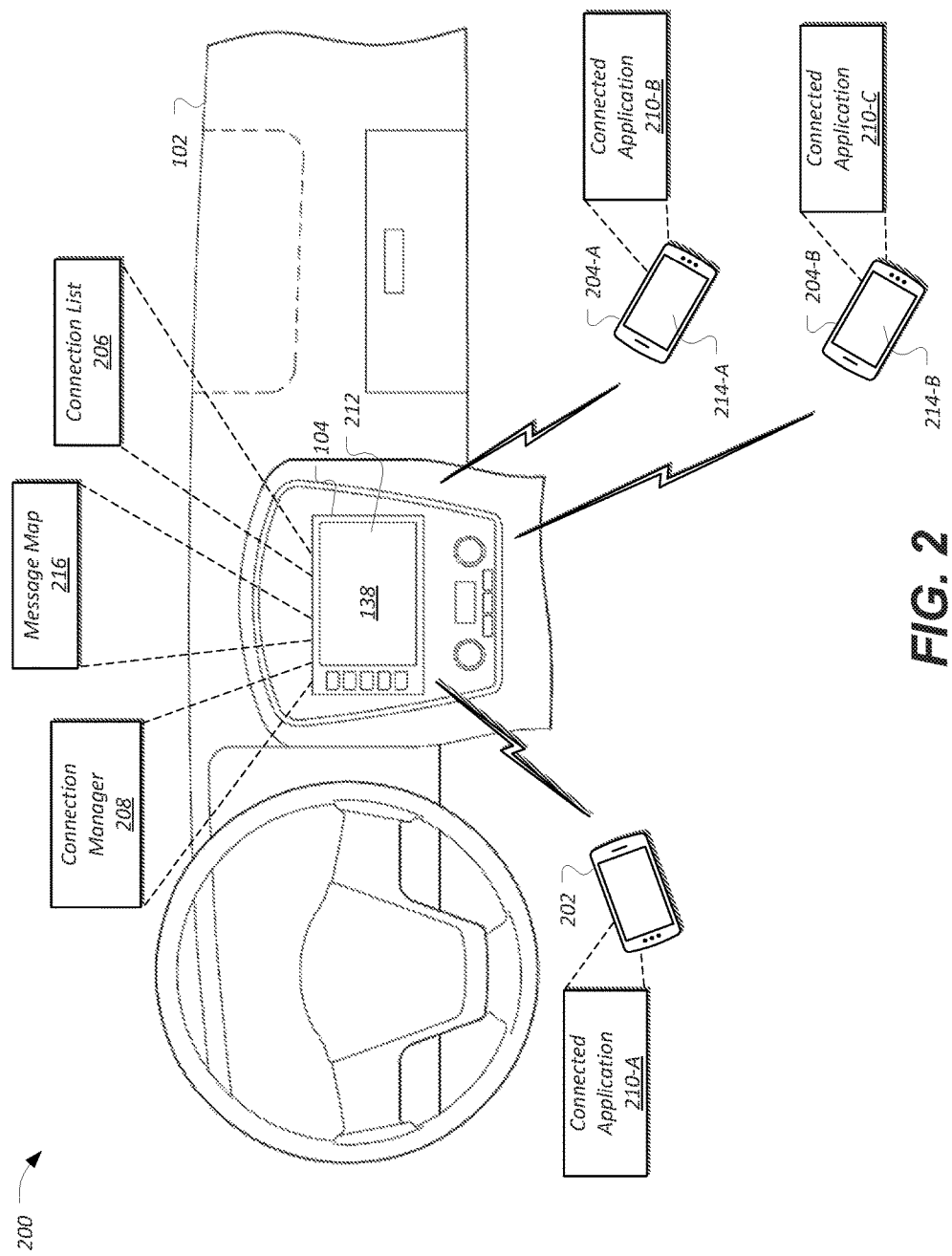
FIG. 2 illustrates an example diagram of a system configured for application control of primary-connected devices from secondary-connected devices.

FIG. 2 illustrates an example diagram 200 of a portion of the system 100 configured for control of a connected application 210 installed to a primary-connected device 202 from one or more secondary-connected devices 204. As illustrated, the vehicle 102 include a display 138 mounted in a HMI control area between the driver and front passenger seats. The vehicle 102 also includes a primary-connected device 202 and secondary-connected devices 204-A and 204-B (collectively 204) connected to the computing platform 104. The connected application 210 is installed to the primary-connected device 202 and also to each of the secondary-connected devices 204. A connection manager 208 is installed to the computing platform 104, which maintains a connection list 206 of the primary-connected device 202 and any secondary-connected devices 204. A connection manager 208 also maintains a message map 216 of request/response messages and HMI notifications for the connected application 210 between the computing platform 104 and the connected devices. The computing platform 104 may be used to allow the secondary-connected devices 204 to communicate with the primary-connected device 202 to control the connected application 210 using the services of the connection manager 208. It should be noted that the illustrated configuration is merely an example, and systems 100 having more or fewer secondary-connected devices 204 or varied device layouts are possible.

The primary-connected device 202 may be a mobile device 152 connected to the computing platform 104 as the primary device. The secondary-connected devices 204 may include other mobile devices 152 connected to the computing platform 104 but that are not connected as the primary device. The connection list 206 may include a listing of the connected mobile devices 152. In an example, the connection list 206 may list the primary-connected device 202, as well as any secondary-connected devices 204.

Figure 3:
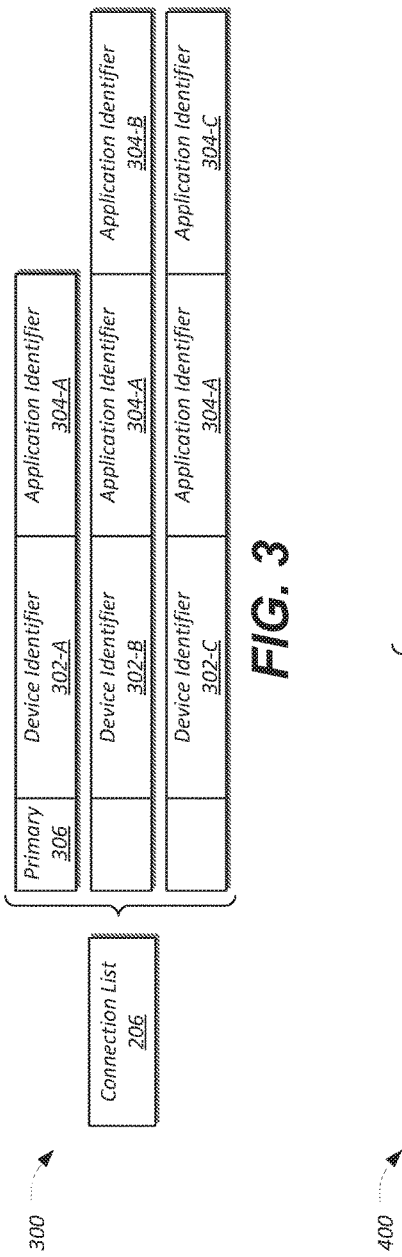
FIG. 3 illustrates an example diagram of a connection list.

FIG. 3 illustrates an example diagram of the connection list 206. As shown, the connection list 206 includes entries for the three devices illustrated in FIG. 2. The primary-connected device 202 is illustrated as the first record of the connection list 206, the secondary-connected device 204-A is illustrated as the second record of the connection list 206, and the secondary-connected device 204-B is illustrated as the third record of the connection list 206. It should be noted that the illustrated connection list 206 is merely an example, and connection list 206 having more, fewer, or differently configured connected mobile devices 152 are possible.

Similar to as done with the paired device data 160, the mobile devices 152 of the connection list 206 may be referenced by their unique device identifiers. Accordingly, the connection list 206 may indicate the device identifiers 302 of the connected mobile devices 152. These device identifiers 302 may include, as some examples, one or more of MAC address, MDN, IP address, MSISDN and/or IMSI information. As shown, the primary-connected device 202 is associated with the device identifier 302-A, the secondary-connected device 204-A is associated with the device identifier 302-B, and the secondary-connected device 204-B is associated with the device identifier 302-C.

The connection list 206 may further indicate which connected applications 210 are available for use on each of the listed mobile devices 152. An application may be available, as some examples, (i) when it is installed to the mobile device 152, (ii) when it is executed by the mobile device 152 as the foreground application, or (iii) when it is executed by the mobile device 152 as the foreground application or a background application. The computing platform 104 may utilize the device link interface 172 to query the mobile devices 152 for application identifiers 304 of the available connected applications 210. For instance, each connected application 210 (or mobile application 170 generally), may be assigned a unique application identifier 304. As shown, the primary-connected device 202 has available a connected application 210 with the application identifier 304-A, the secondary-connected device 204-A has available connected applications 210 with the application identifiers 304-A and 304-B, and the secondary-connected device 204-A has available connected applications 210 with the application identifiers 304-A and 304-C.

The connection list 206 may further indicate which of the connected mobile devices 152 is the primary-connected device 202, and which are connected as secondary-connected devices 204. As shown, the mobile device 152 having the device identifier 302-A is indicated by the primary indication 306 as being the primary-connected device 202.

Referring back to FIG. 2, the connection manager 208 may be configured to manage the connections of the primary-connected device 202 and the secondary-connected devices 204. In an example, the connection manager 208 may be configured to receive signals from the wireless transceiver 150 to detect the mobile devices 152 located within the vehicle 102, and access the paired device data 160 to determine whether the identified mobile devices 152 are paired with the vehicle 102. Based on the device identifiers 302 of the located mobile devices 1523 and the paired device data 160, the connection manager 208 may be further configured to cause the computing platform 104 to connect to the mobile devices 152 that are authorized to connect to the computing platform 104.

As an example, the device identifier 302 of the primary-connected device 202 may be designated as being a favorite device in the paired device data 160, such that the connection manager 208 may cause the computing platform 104 to automatically reconnect to the mobile device 152 as the primary-connected device 202 when the device identifier 302 of the mobile device 152 is identified by the wireless transceiver 150 as being within the vehicle 102. For instance, the primary-connected device 202 may be designated in the paired device data 160 as being a highest priority device compared to other located devices within the vehicle 102. Or, the primary-connected device 202 may be the first device identified in the paired device data 160 that is located within the vehicle. Moreover, the connection manager 208 may cause the computing platform 104 to automatically reconnect to the mobile device 152 as a secondary-connected device 204 when the device identifier 302 of the mobile device 152 is identified by the wireless transceiver 150 as being within the vehicle 102, but where the device identifier 302 is included in an entry of the paired device data 160 that is the favorite or highest priority device.

The connection manager 208 may further be configured to update the connection list 206 to track changes to the mobile devices 152 connected to the computing platform 104. In an example, if the connection manager 208 identifies a new mobile device 152 that has higher priority than the current primary-connected device 202, the connection manager 208 may cause the computing platform 104 to connect to the new mobile device 152 as the primary-connected device 202, and to reconnect to former primary-connected device 202 as a secondary-connected device 204. In other examples, the connection manager 208 may make the determination of the primary-connected device 202 once, and may not update the determination. When a mobile device 152 is connected, disconnected, or if there is a change in which device is the primary-connected device 202, the connection manager 208 may update the entries of the connection list 206 accordingly.

As mentioned above, the connected application 210 may be installed to the primary-connected device 202. When executed by the primary-connected device 202, the connected application 210 may utilize the features of the computing platform 104. In an example, the connected application 210 may be an audio streaming application, and may utilize the audio playback functionality of the audio module 122 to stream audio content from a server connected to the wide-area network 156 for playback. The connected application 210 may further provide a user interface 212 to the display 138 of the computing platform 104. The user interface 212 may allow for a user to receive visual output from the connected application 210 and/or provide touch input to the primary-connected application 210.

The connected application 210 may also be installed to the secondary-connected devices 204. When executed by the secondary-connected devices 204, the connected application 210 may further provide a user interface 216 to the display of the secondary-connected device 204. The user interface 214 may also allow for a user to receive visual output from the connected application 210 and/or provide touch input to the primary-connected application 210. To do so, when executed by the secondary-connected devices 204, the connected application 210 may communicate with the computing platform 104, which may use the message map 216 to provide for auxiliary control of the connected application 210 being executed by the primary-connected device 202.

Figure 4:
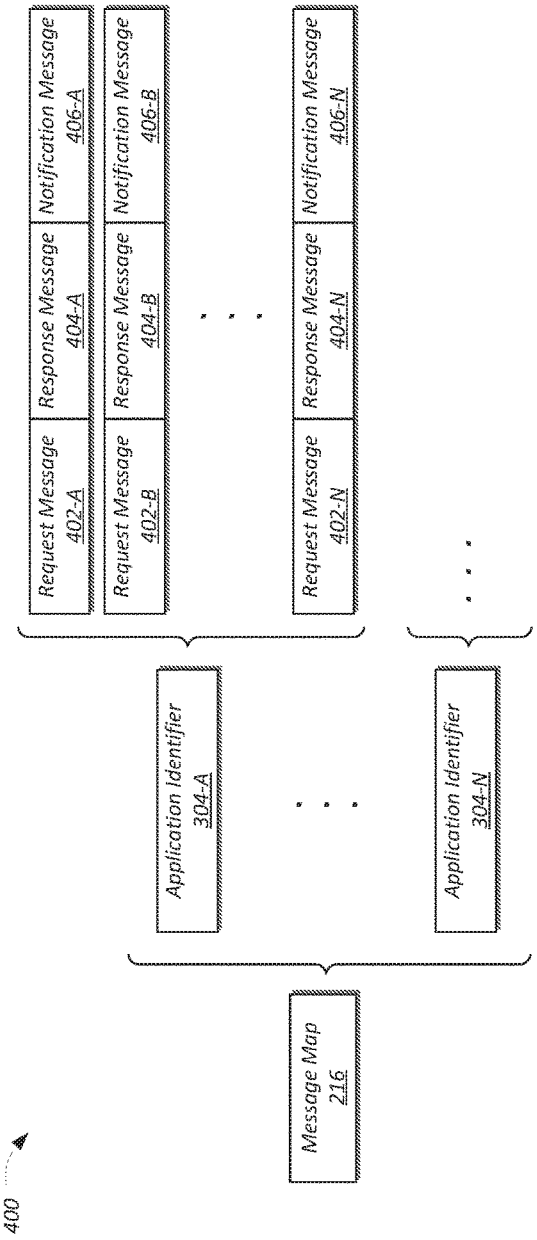
FIG. 4 illustrates an example diagram of a message map.

FIG. 4 illustrates an example diagram of the message map 216. The message map 216 includes associations of request message 402/response message 404 pairs with notification messages 406 of the same type. Request messages 402 are messages which originate from a secondary-connected device 204, and that are sent to the computing platform 104 of the vehicle 102. Response messages 404 are messages which originate from the computing platform 104, and that are sent to the secondary-connected device 204 in response to receipt of the request message 402 from the secondary-connected device 204. Notification messages 406 are messages which originate from the computing platform 104, and that are sent to the primary-connected device 202 in response to receipt of the request message 402 from the secondary-connected device 204. It should be noted that the illustrated message map 216 is merely an example, and message maps 216 having information for more, fewer, or different connected applications 210 are possible.

The request messages 402 may be of various types based on the functionality of the connected application 210. For example, if the connected application 210 is a media playback application, the request messages 402 may include types such as a request to play a particular song, a request to pause playback, a request to skip to a next song, and/or a request to increase, decrease, mute or otherwise adjust the volume level.

For each type of request message 402 for the connected application 210, the message map 216 maintains a corresponding notification message 406 type. The corresponding notification message 406 type may be a HMI notification type used to send the primary-connected device 202 a simulated HMI notification based on the information of the request message 402 type. The simulated HMI notification may be constructed by the computing platform 104 based on the based on the information of the corresponding request message 402. For instance, if the request message 402 indicates for the currently played song to be paused, the corresponding notification message 406 may be an HMI notification indicative of a user pressing a pause button on the user interface 212 provided to the display 138. Or, if the request message 402 indicates for a new song to be played, the corresponding notification message 406 may be an HMI notification indicative of a user selection of the song from a song listing of the user interface 212.

For each type of request message 402 for the connected application 210, the message map 216 maintains a corresponding response message 404 type. The response message 404 may be a message returned to the secondary-connected device 204 indicating whether the notification message 406 was sent, or in other cases, whether the notification message 406 was successfully executed by the primary-connected device 202.

Figure 5:
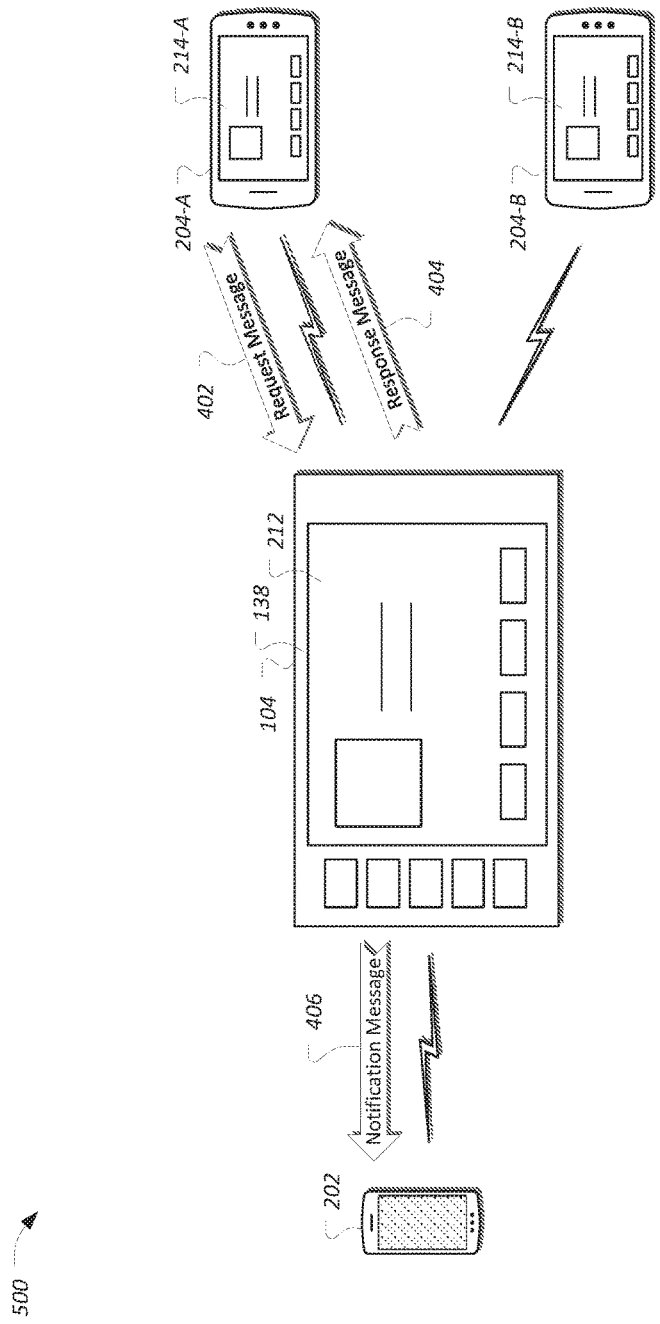
FIG. 5 illustrates an example diagram of a secondary-connected device providing command input to the primary-connected device.

FIG. 5 illustrates an example diagram of a secondary-connected device 204 providing command input to the primary-connected device 202. In an example, a user of the secondary-connected device 204-A may provide input to the user interface 214-A of the secondary-connected device 204-A, such as by pressing a button or other control of the auxiliary user interface 214-A provided by the connected application 210. Responsive to the input, the connected application 210 may send a request message 402 to the computing platform 104 over the connection between the secondary-connected device 204-A and the computing platform 104.

The connected application 210 may include the device identifier 202-B of the secondary-connected device 204-A, the application identifier 204-A of the connected application 210, and any information specific to the request message 402 type indicating a requested operation in the request message 402. In response to the request message 402, the computing platform 104 may use the connection list 206 to confirm that the device identifier 202-B is of a mobile device 152 included on the connection list 206, as well as to identify the identity of primary-connected device 202. Notably, as the primary-connected device 202 is connected to the computing platform 104 as the driver device, the display of the primary-connected device 202 may be disabled from receiving input. Thus, request messages 402 responsive to HMI input are not typically received by the computing platform 104 from the primary-connected device 202. Instead, control of the connected application 210 by the driver may be performed through use of the HMI features of the computing platform 104.

The computing platform 104 may access the message map 216 to identify the corresponding notification message 406 for the received request message 402. Using the identification of the primary-connected device 202 from the connection list 206, and the information included by the secondary-connected device 204 in the request message 402, the computing platform 104 constructs the notification message 406 to send to the primary-connected device 202. The computing platform 104 then sends the notification message 406 to the device identifier 302 of the mobile device 152 indicated in the connection list 206 as being the primary-connected device 202 (e.g., the device identifier 302-A as shown the FIG. 3). For instance, if the request message 402 indicates for the currently played song to be paused, the corresponding notification message 406 may be an HMI notification indicative of a user pressing a pause button on the user interface 212 provided to the display 138. Or, if the request message 402 indicates for a new song to be played, the corresponding notification message 406 may be an HMI notification indicative of a user selection of the song from a song listing of the user interface 212.

The computing platform 104 additionally may send a response message 404 to the secondary-connected device 204 sending the request message 402. In some examples, the response message 404 may indicate whether or not the notification message 406 was sent by the computing platform 104 to the primary-connected device 202.

In other examples, the response message 404 may include additional information based on the specific type of request message 402 being sent. For instance, the computing platform 104 may access the message map 216 to identify the corresponding response message 404 type for the received request message 402. The computing platform 104 constructs the response message 404 to send to the secondary-connected device 204 based on the information indicated in the message map 216 to be provided in the corresponding response message 404 type.

Such an approach may be used to allow the sender of the request message 402 to receive response messages 404 including specific information. For instance, the secondary-connected device 204 may send a request message 402 for a specific element of information (e.g., current song title, available songs, current volume level, etc.), where the computing platform 104 may request the information from the primary-connected device 202 in a notification message 406, receive the information from the primary-connected device 202 in a response (not illustrated) to the notification message 406, and provide the requested information back to the secondary-connected device 204 in the response message 404. Thus, the disclosed messaging approach may be used by secondary-connected devices 204 to generally retrieve information from the primary-connected device 202.

Figure 6:
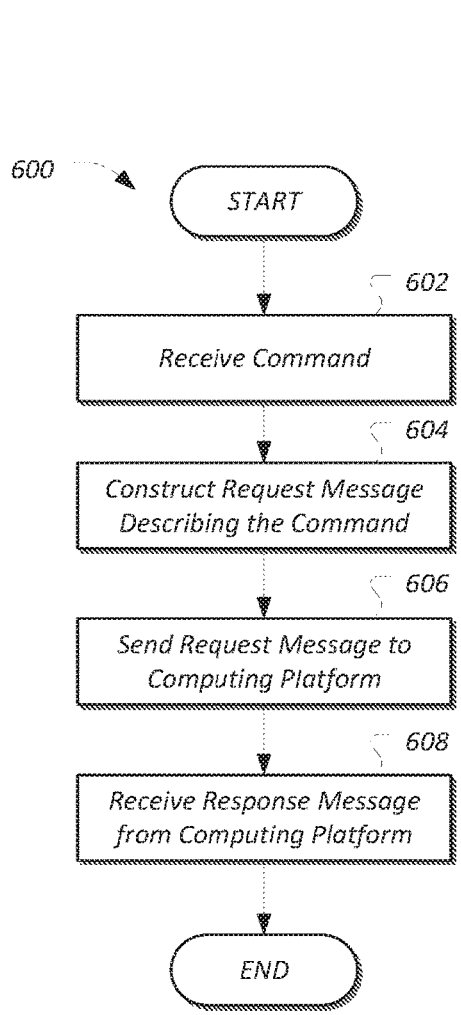
FIG. 6 illustrates an example diagram of a process for the secondary-connected device sending a request message to the computing platform to control the connected application executed by the primary-connected device.

FIG. 6 illustrates an example diagram of a process 600 for the secondary-connected device 204 sending a request message 402 to the computing platform 104 to control the connected application 210 executed by the primary-connected device 202. In an example, the process 600 may be performed by the secondary-connected device 204 connected to the computing platform 104 of the vehicle 102.

At operation 602, the secondary-connected device 204 receives a command. In an example, a user of the secondary-connected device 204 may provide input to the user interface 214 of the secondary-connected device 204, such as by pressing a button or other control of the auxiliary user interface 214 provided by the connected application 210. For instance, the user may provide input to a control of the user interface 214 requesting to pause a song currently being played through the computing platform 104 by the primary-connected device 202. Or, the user may provide input to the user interface 214 indicates for a new song to be played through the computing platform 104 by the primary-connected device 202. In other examples, the command may be a request for an element of information requested from the primary-connected device 202, such as the current song title, indications of available songs, or a current volume level.

At operation 604, the secondary-connected device 204 constructs a request message 402 describing the requested command. The request message 402 may specify an application identifier 304 of the requesting connected application 210, as well as details of the request. In an example, responsive to the input, the connected application 210 executed by the secondary-connected device 204 may construct a request message 402 specifying an action requested according to the user input to the user interface 214 of the secondary-connected device 204. For instance, if the user input indicates for the currently played song to be paused, the request message 402 may specify a pause command. Or, if the user input indicates for a new song to be played, the request message 402 may specify an indication of the song to be played. Or, if the request is for an element of information, the element of information may be specified by the request message 402.

At operation 606, the secondary-connected device 204 sends the request message 402 to the computing platform 104. In an example, the secondary-connected device 204 sends the request message 402 to the computing platform 104 over the BLUETOOTH, USB, or Wi-Fi connection between the secondary-connected device 204 and the computing platform 104.

At operation 608, the secondary-connected device 204 receives a response message 404 from the computing platform 104. In an example, the secondary-connected device 204 receives the response message 404 responsive to the request message 402. The response message 404 may indicate one or more of whether the request message 402 was successfully sent to the primary-connected device 202, whether the request message 402 was successfully handled by the primary-connected device 202. Additionally or alternately, the response message 404 may include an element of information requested from the primary-connected device 202 by the secondary-connected device 204, such as the current song title, indications of available songs, or a current volume level. After operation 608, the process 600 ends.

Figure 7:
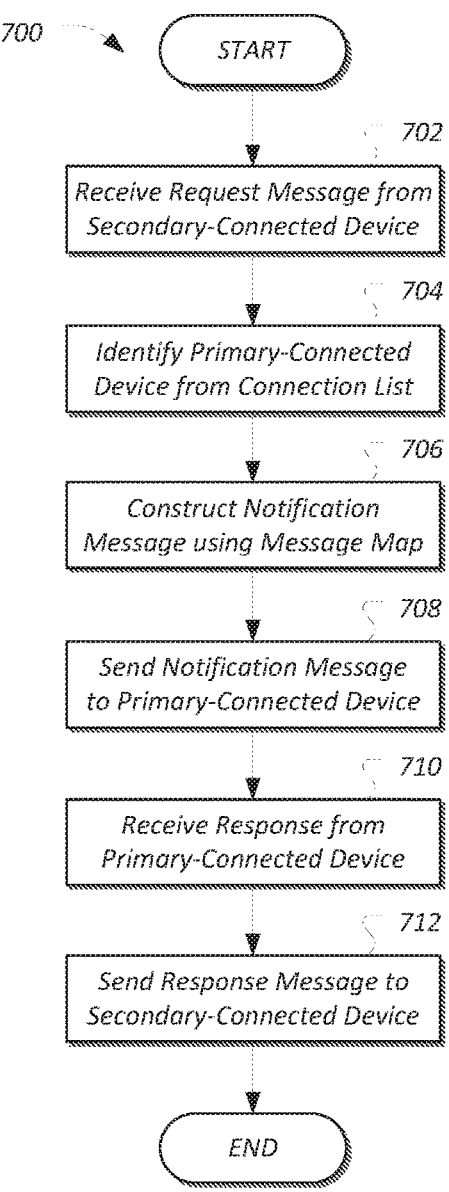
FIG. 7 illustrates an example diagram of a process for the computing platform sending a notification message corresponding to the request message to the primary-connected device.

FIG. 7 illustrates an example diagram of a process 700 for the computing platform 104 sending a notification message 406 corresponding to the request message 402 to the primary-connected device 202. In an example, the process 700 may be performed by the computing platform 104 connected to the secondary-connected device 204 and the primary-connected device 202.

At operation 702, the computing platform 104 receives a request message 402 from the secondary-connected device 204. In an example, request message 402 may be received from the secondary-connected device 204 as described above with respect to operations 602-606 of the process 600. For instance, the request message 402 may be responsive to user-provided input to a control of the user interface 214 of the secondary-connected device 204. Or, the request message 402 may be responsive to a command from the connected application 210 requesting an element of information from the secondary-connected device 204.

At operation 704, the computing platform 104 identifies the primary-connected device 202 from the connection list 206. In an example, the computing platform 104 may access the connection list 206 to identify which of the mobile devices 152 of the connection list 206 is indicated by the primary indication 306 as being the primary-connected device 202.

At operation 706, the computing platform 104 uses the message map 216 to construct the notification message 406 corresponding to the request message 402. In an example, the computing platform 104 may access the message map 216 for the application identifier 304 and type of the request message 402 to determine the corresponding notification message 406 type. For instance, if the request message 402 indicates for the currently played song to be paused, the corresponding notification message 406 may be an HMI notification indicative of a user pressing a pause button on the user interface 212 provided to the display 138. Or, if the request message 402 indicates for a new song to be played, the corresponding notification message 406 may be an HMI notification indicative of a user selection of the song from a song listing of the user interface 212. Or, if the request message 402 is for an element of information, the corresponding notification message 406 may be a message for requesting the specified element of information.

At operation 708, the computing platform 104 sends the notification message 406 to the primary-connected device 202. In an example, the computing platform 104 sends the notification message 406 constructed at operation 706 to the primary-connected device 202 identified at operation 704.

At operation 710, the computing platform 104 receives a response from the primary-connected device 202. In an example, the response from the primary-connected device 202 indicates whether the notification message 406 was successfully processed by the primary-connected device 202 (e.g., the requested command was performed). In another example, the response from the primary-connected device 202 indicates the information requested by the request message 402. In should be noted that in other examples (such as for many commands representing HMI input to the display 138 of the computing platform 104), the notification message 406 is purely a notification, and no response is received by the computing platform 104 from the primary-connected device 202.

At operation 712, the computing platform 104 sends a response message 404 to the secondary-connected device 204. In an example, the response message 404 may be sent to the secondary-connected device 204 as described above with respect to operations 608 of the process 600. For instance, the computing platform 104 may generate and send a response message 404 to the secondary-connected device 204, responsive to receipt of the request message 402 by the computing platform 104. As some possibilities, the response message 404 may indicate whether or not the notification message 406 was sent to the primary-connected device 202, whether or not the command specified by the notification message 406 was successfully performed to the primary-connected device 202, and/or an element of information requested by the secondary-connected device 204 from the primary-connected device 202. After operation 712, the process 700 ends.

Computing devices described herein, such as the computing platform 104, mobile devices 152, primary-connected devices 202, and secondary-connected devices 204, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a memory of a vehicle storing a message map associating request types with human-machine interface (HMI) notification types generated responsive to vehicle user input; and
a processor of the vehicle, programmed to
receive a request from a secondary-connected device, and
send an HMI notification, constructed based on the message map and the request, to a primary-connected device to simulate vehicle user input to cause the primary-connected device to perform the request.

2. The system of claim 1, wherein the processor is further programmed to:
construct a response message using the message map, and send the response message to the secondary-connected device.

3. The system of claim 2, wherein the processor is further programmed to:
receive a response from the primary-connected device, and
construct the response message further according to information received in the response from the primary-connected device.

4. The system of claim 1, wherein the message map is further configured to associate the requests with the HMI notifications, per application, by application identifier.

5. The system of claim 1, wherein the memory further stores a connection list including identifiers of connected devices, and the processor is further programmed to identify the primary-connected device according to the connection list.

6. The system of claim 1, further comprising a display screen of the vehicle, wherein the processor is further programmed to:
receive user input to the display screen, and
send a second HMI notification to the primary-connected device based on the user input.

7. The system of claim 1, wherein the primary-connected device is connected to the vehicle as a driver device, and a display screen of the primary-connected device is disabled from receiving user input due to the primary-connected device being the driver device.

8. A method comprising:
receiving a command initiated at a secondary-connected device connected to a vehicle computing platform;
constructing a request message by the secondary-connected device describing the command; and
sending the request message to the computing platform to cause the computing platform to send a simulated human-machine interaction (HMI) notification to a primary-connected device connected to the computing platform requesting the primary-connected device to perform the command, the simulated HMI notification being generated according to a message map stored to the computing platform and associating request types with human-machine interface (HMI) notification types generated responsive to user input to the computing platform.

9. The method of claim 8, further comprising receiving the command as user input to a display of the secondary-connected device.

10. The method of claim 8, further comprising receiving the command programmatically from a connected application executed by the secondary-connected device.

11. The method of claim 8, further comprising receiving a response message from the computing platform indicating whether the HMI notification was sent to the primary-connected device.

12. The method of claim 8, wherein the command requests an element of information from the primary-connected device, and further comprising receiving a response message from the computing platform including the element of information requested by the secondary-connected device provided from the primary-connected device.

13. The method of claim 8, wherein the primary-connected device is connected to the vehicle as a driver device, and the secondary-connected device is connected to the vehicle but not as the driver device.

14. A non-transitory computer-readable medium, comprising instructions that, when executed by a processor of a computing platform of a vehicle, cause the computing platform to:
receive a request message from a connected application of a secondary-connected device;
access a message map corresponding to the connected application to determine a type of a notification message associated with a type of the request message, the message map stored to the vehicle and associating request types with human-machine interface (HMI) notification types generated responsive to user input to the vehicle computing platform;

access a connection list including entries for each mobile device connected to the vehicle to identify a primary-connected device; and send the notification message to the primary-connected device to simulate user input to the vehicle, to cause the primary-connected device to process the request message.

15. The medium of claim 14, further comprising instructions to cause the computing platform to:

access the message map to determine a response message associated with the request message for the connected application; and send the response message to the secondary-connected device.

16. The medium of claim 15, wherein the processor is further programmed to:

receive a response from the primary-connected device, and construct the response message further according to information received in the response from the primary-connected device.

17. The medium of claim 15, wherein the processor is further programmed to:

receive user input to a display screen of the vehicle, and send a second HMI notification to the primary-connected device based on the user input to the display screen.

18. The medium of claim 14, wherein the connected application is associated with an application identifier, the medium further comprising instructions to cause the computing platform to determine the message map corresponding to the connected application according to the application identifier of the connection application.

* * * * *